B. F. STURTEVANT.
Grain Drier.
No. 100,235. Patented Feb. 22, 1870.
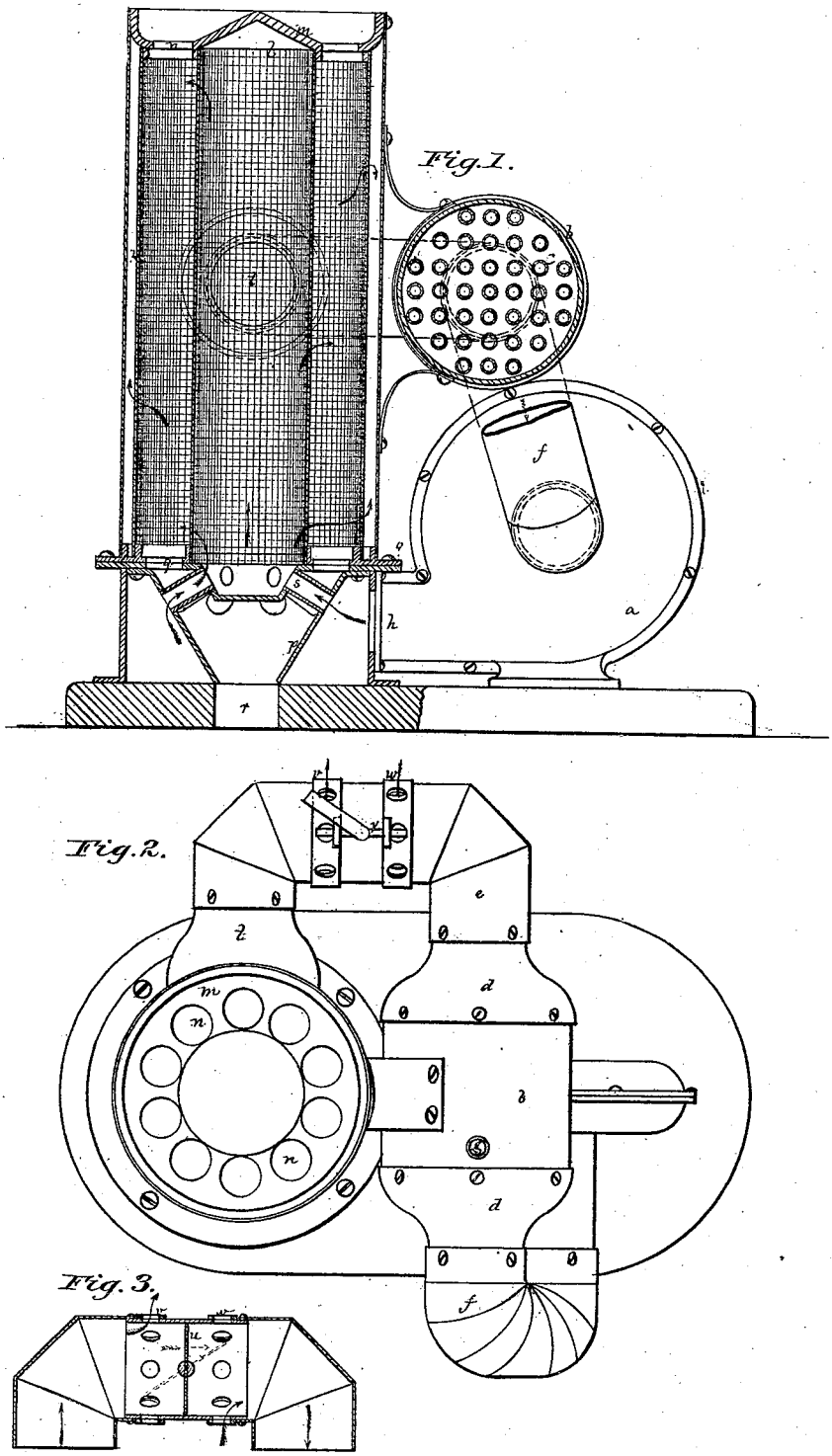

UNITED STATES PATENT OFFICE.

B. F. STURTEVANT, OF JAMAICA PLAIN, MASSACHUSETTS.

Letters Patent No. 100,235, dated February 22, 1870.

GRAIN-DRIER.

The Schedule referred to in these Letters Patent and making part of the same.

*To all whom it may concern:*

Be it known that I, B. F. STURTEVANT, of Jamaica Plain, in the county of Norfolk, and State of Massachusetts, have invented Improvements in Driers for Granular Matter; and I do hereby declare that the following, taken in connection with the drawings which accompany and form part of this specification, is a description of my invention sufficient to enable those skilled in the art to practice it.

This invention relates to certain new and useful improvements in the construction and arrangement of apparatus for drying granular matter by forced circulation through said matter of currents of heated air, and for cooling said matter by a forced circulation through it of currents of cool air, the invention being chiefly applicable to the drying and cooling of grain, though it may be used to dry or cool other granular materials.

Figure 1 of the drawings shows in vertical sectional elevation an apparatus embodying my invention;

Figure 2 shows the said apparatus in plan; and

Figure 3 is a sectional detail of a valvular apparatus to be used for purposes hereinafter described.

The air used for heating or cooling the grain is put in motion by a pressure-blower of any suitable construction, seen at $a$, and the air is heated by passing through a heater of suitable construction, either before passing into the blower or after it leaves the blower.

In the drawing the heater is shown as arranged to heat the air before it passes into the blower. The heater is shown as located above the blower, and is made as a cylindrical case, $b$, the ends or heads of which are fitted with tubes, $c$, the ends of which open into spaces covered by bonnets, $d$, to which are connected pipes $e$ and $f$, the air entering pipe $e$ and passing through tubes $c$ into pipe $f$, which connects with the central inlet to the blower.

The space in case $b$ around tubes $c$ is filled from pipe $g$ with direct or exhaust steam or with hot gases, such as the volatile products of combustion or heated air; and for the escape of the water of condensation, or to create a flow of the heating medium through the case $b$, an escape-pipe is provided, not shown in the drawings.

The heated current of air is forced by the action of the blower through its outlet $h$ into a hollow base, $i$, which supports the outer casing $j$ of the grain-drier.

Within said casing, and concentrically arranged with respect to it and with respect to each other, are two wire-cloth or perforated or foraminous pipes, $k$ and $l$, the tops of which and the top of the casing $j$ are covered with and braced and supported by a piece shaped as shown, so as to serve as a hopper to receive and discharge grain into the space between the outer pipe $k$ and the inner pipe $l$, through suitable openings, $n$, made in the piece $m$.

The pipes $k$ and $l$ rest on a plate, $o$, provided with suitable flanges, to which are secured the casing $j$ and the said pipes, the plate $o$ resting on and being secured to the base $i$.

The plate $o$ is made dishing, as shown, at its center, and within the base $i$ is a conical piece, $p$, arranged with its large end uppermost, and which serves to catch the grain as it moves through the annular space between the pipes $p$ and $l$, through openings $q$, to the delivery passage $r$.

To admit the air forced by the blower into the space contained between the base $i$ and the piece $p$ into the base of the inner pipe $l$, the pipes $s$ are arranged as shown. It will be obvious that the air, when forced by the blower into the base $i$, will pass through pipes $s$ into the pipe $l$, and will escape from it along its length laterally, and will pass through the grain contained between pipes $k$ and $l$, and through pipe $k$ into the space between it and the casing $j$, from which space it passes off through the passage $t$, which passage is connected with the pipe $e$, so that the same air is worked repeatedly through the apparatus by the blower.

It will often be necessary or desirable to allow the hot or warm damp air to escape from the apparatus, carrying off with it the moisture which it has extracted from the grain, and to supply its place with dry, cool air, and to enable me to circulate the same air continuously through the apparatus, or to take in fresh air and to discharge all of it, or to circulate some of the air and discharge some of it, supplying the portion which is allowed to escape by fresh air, I make use of the apparatus shown in detailed section, fig. 3, and in plan in fig. 2. The pipe $e$ is perforated in two places, as shown, with two lines of holes extending around the pipe at some distance apart, and within the pipe, midway between the perforations, is placed a damper or valve, $u$.

On the pipe $e$ are placed two perforated rings, $v$ and $w$, which, by partial rotation, are made to control the openings through the pipe. These rings which serve as valves, which open and close the perforations through pipe $e$, are connected with each other and with the valve $u$ by means of a bar, $x$, on the spindle of valve $u$, so that when valve $u$ is open, as indicated in dotted lines, fig. 3, the openings through the perimeter of pipe $e$ are closed. Or, the adjustment of the valves $u$ $v$ $w$ may be such as to leave the area of the pipe $e$ partially obstructed by valve $u$, and the perforations through the perimeter of said pipe partly open. When so adjusted, then fresh air will flow into pipe $e$ through the openings controlled by the ring $w$, and some of the air which has been forced through the grain will escape through the openings controlled by ring $v$, and the balance of the air will pass valve $u$, and will mingle with the incoming current of fresh air, and the mixture will be drawn into the blower, and will be forced by it through the grain.

When all the moisture has been dried out of the grain and carried off by an escaping current of warm or hot dry air, if it is desirable to cool the grain before allowing it to escape from the drier, valve $u$ is fully closed, and valves $v$ and $w$ are fully opened, and steam is shut off from the heater. Then the blower will operate to force cool dry air through the grain, abstracting from it the heat with which it may have been charged. Commonly, however, the operations of admitting grain to the top of the drier and of drawing it off from the bottom, will go on simultaneously, and all of the valves $u$ $v$ $w$ will be set partially open, so as to allow a portion of the air set in motion by the blower to escape constantly.

The outlet from the grain-drier is provided with a suitable slide or gate, adjustment of which regulates both the inlet and exit of the grain.

The apparatus shown is designed to be portable, all the parts being so connected that to put it in use it is only necessary to connect the steam and condensed water-pipes to the heater and to belt the blower-pulley.

I claim—

A grain-drier made up of a tube of wire-cloth or other suitable perforated or foraminous material, surrounded by another similar tube, partition, or screen, so as to leave a space between the inner and outer wire cloths for reception of granular matter, when so combined with the air-heating and blowing apparatus, constructed substantially as described, as to cause currents of air to pass through the grain, for the purpose specified.

Also, in combination with the apparatus claimed, an outer case, $j$, provided with a return pipe, $e$, leading to a heater, and from that by a pipe, $d$, to the air-moving apparatus for reheating air which has passed through the grain.

Also, an arrangement of air-passages which, in connecting the inner air-space with the air-moving apparatus, pass through the space allotted to the grain.

Also, the combination of the heating and blowing apparatus, constructed substantially as described, and grain-bin with one or more wire-cloth air-distributing pipes.

Also, the inlet and outlet passages, controlled by the valves $v$ and $w$, combined with the valve $u$ and pipe $e$, for the purpose specified.

B. F. STURTEVANT.

Witnesses:
J. F. BEALE,
JNO. J. HALSTED.